Figure 1:
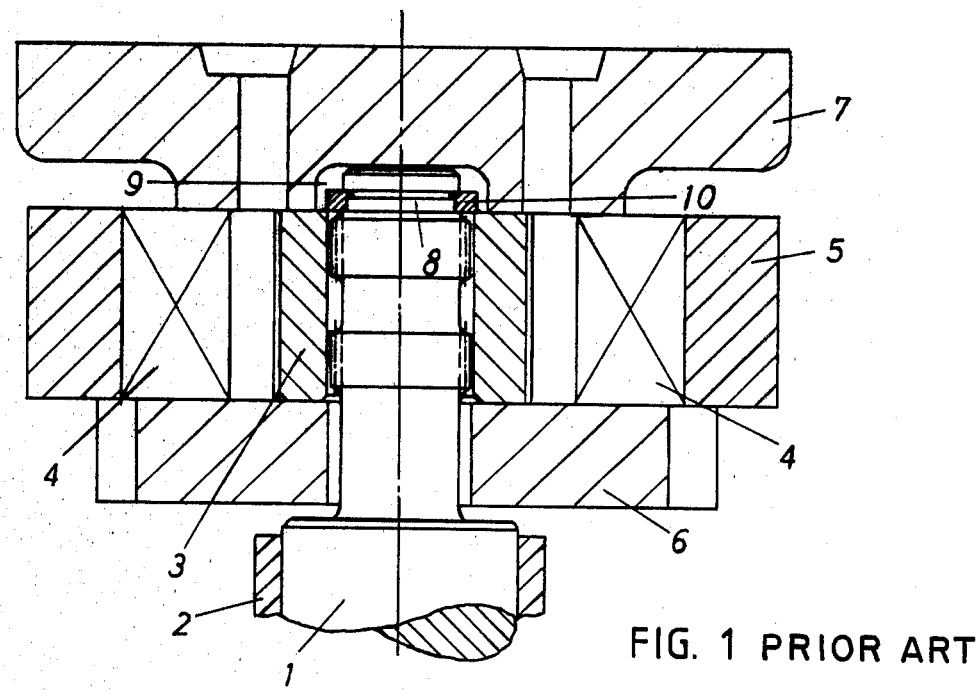

United States Patent [19]

Ilg

[11] 4,354,808
[45] Oct. 19, 1982

[54] VANE PUMP HAVING SLEEVE BEARING AND ROTOR RETAINING CONSTRUCTION

[75] Inventor: Rudolf Ilg, Aalen, Fed. Rep. of Germany

[73] Assignee: Zahnradfabrik Friedrichshafen, AG., Friedrichshafen, Fed. Rep. of Germany

[21] Appl. No.: 112,184

[22] Filed: Jan. 15, 1980

[30] Foreign Application Priority Data

Jan. 25, 1979 [DE] Fed. Rep. of Germany ....... 2902723

[51] Int. Cl.³ .............. F04C 2/00; F04C 15/00; F16B 21/18; F16D 1/06
[52] U.S. Cl. .................. 418/259; 418/270; 403/316; 403/326; 403/360
[58] Field of Search ............... 418/70, 133, 182, 259, 418/268, 270, 260–267, 269; 403/316, 326, 360, DIG. 7

[56] References Cited

U.S. PATENT DOCUMENTS

| T927,009 | 10/1974 | Ulrich | 418/133 |
| 2,435,279 | 2/1948 | Hubacker | 418/268 |
| 3,200,752 | 8/1965 | Clark et al. | 418/266 |
| 3,709,530 | 1/1973 | Redding | 403/360 |

FOREIGN PATENT DOCUMENTS

| 2327566 | 1/1974 | Fed. Rep. of Germany | 403/326 |
| 2423773 | 11/1975 | Fed. Rep. of Germany | 418/268 |

Primary Examiner—John J. Vrablik
Attorney, Agent, or Firm—Zalkind & Shuster

[57] ABSTRACT

A mode of assembly for a vane pump rotor and drive shaft provides a construction wherein a plain, i.e., sleeve or collar type bearing can be used for the support of the drive shaft. The arrangement affords axial positional securing, i.e., axial fixation of the drive shaft with a spring ring peripherally confined by a recess in the pump rotor to prevent its being dislodged and thus affording safety in maintaining axial securement of the drive shaft.

1 Claim, 2 Drawing Figures

VANE PUMP HAVING SLEEVE BEARING AND ROTOR RETAINING CONSTRUCTION

In vane pumps sleeve bearings have been used with split ring retaining rings on the end of the drive shaft for securing the drive shaft within the rotor. However, where the rotor is supported in a plain sleeve bearing, there have been occasions where the retaining ring was dislodged and the pump failed, since the axial relationship between shaft and rotor was destroyed. Prior art constructions have overcome the lack of safety of the retaining ring assemblies by using ball or roller bearings instead of sleeve bearings which, however, are, of course, much more expensive.

In the use of a ball or roller bearing, the inner race can be secured to the drive shaft and the outer race fixedly held, for example, in an engine mount. Accordingly, there would be no significant shift of the drive shaft axially and therefore much less tendency for axial forces to be exerted on the retaining ring which would cause it to become dislodged. However, where a sleeve bearing is used, the drive shaft can, of course, axially shift, and this could cause axial stress on the retaining ring sufficient at times to dislodge it.

In such prior art, the retaining ring was generally carried in a groove at the end of the drive shaft and disposed in an axial recess within a face plate of the pump, the face plate on the pump cover side, a recess in which the free end of the shaft projected. In such constructions, the outside diameter of the retaining ring was made slightly larger than the bore in the rotor through which the drive shaft protruded, so that the ring, at the outer, or free end of the shaft would bear against the outer face of the rotor hub. In such manner was the axial securement achieved.

The construction just described always presented a danger of the retaining ring being dislodged from the groove due to axial forces which can be very high, considering the pressures used in hydraulic steering systems of vehicles, and accordingly sleeve bearings are not desirable for support of pump shafts in such systems. A dislodging of a retaining ring could occur for various reasons. For example, an improperly manufactured belt pulley where the pulley did not run true in a belt drive would produce a dynamic stress which could result in dislodging of the retaining ring. Also, were a belt pulley to be improperly mounted, the retaining ring could be forced out of its holding groove.

The present invention makes possible the use of a sleeve bearing for a drive shaft which is securely fixed in axial direction. The construction comprises providing a groove for a retaining ring at the free end of the drive shaft and an open faced recess in the hub of the rotor at the free end, facing the direction of the pump cover. The retaining ring, a resilient or split spring ring, is snapped into the groove and fits into such recess which confines it radially so that it cannot be dislodged. Since dislodgment would require expansion of the ring in order to jump out of the groove the peripheral wall of the recess prevents such expansion.

Accordingly, dislodging of the retaining ring is safely avoided by the construction briefly described above, and inasmuch as the groove in the drive shaft for the retaining ring is not within the confines of a recess in the pump face plate as in the prior art, but within a recess of the rotor, the retaining ring is supported radially being substantially trapped in the drive shaft groove for all practical purposes during pump operation. Such a construction permits the retaining ring to absorb much higher axial forces than would be otherwise possible. A particular advantage resides in the fact that the rotation of the pump rotor with the drive shaft occasions no friction against the retaining ring.

An added advantage is the fact that the recess in the rotor hub is made of a depth at least equal to the thickness of the retaining ring plus a desired predetermined axial clearance between the end of the drive shaft and the bottom of a face plate recess into which it projects. This results in maintenance of the predetermined axial clearance.

Although the rotor recess herein is shown as an annular recess open in the direction of the face plate on the cover side of the pump, it will be understood that other shapes of recesses could be used for special shaft retaining rings. The use of an annular recess in the rotor assembly is very simple, it merely being necessary to dispose the retaining ring into the groove at the free end of the drive shaft.

Although various kinds of retaining rings can be used, for purposes of simplicity a conventional split or string ring is understood to be depicted herein.

Figure 2:
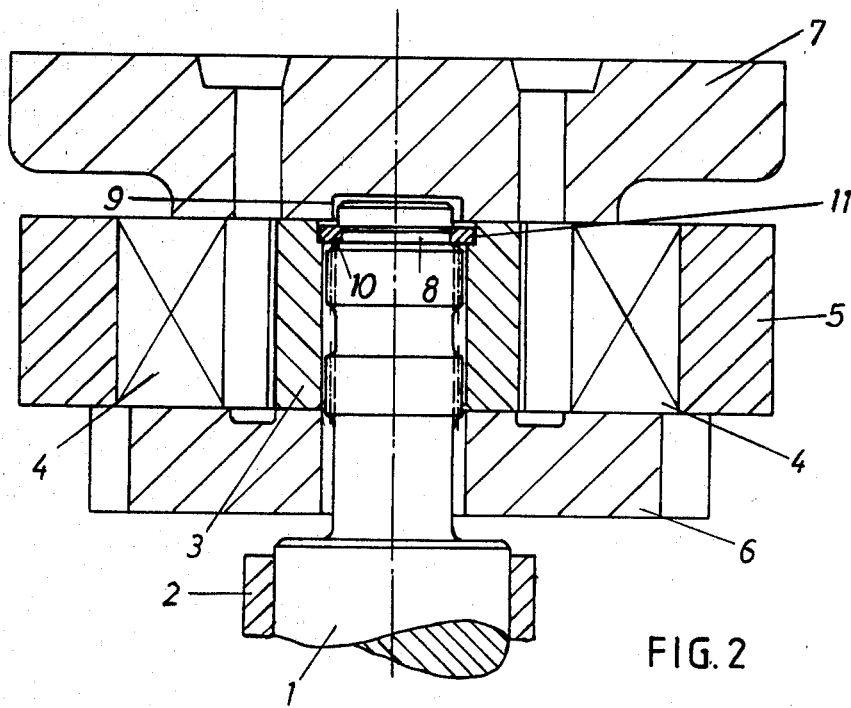

A detailed description of the invention now follows, in conjunction with the appended drawing, in which:

FIG. 1 shows a longitudinal cross section of a vane type pump of the prior art having a sleeve bearing, and FIG. 2 shows essentially the same vane type pump having a sleeve bearing but showing a construction of the invention for assembly of the components.

The pump is shown in FIG. 1 as having a drive shaft 1 carried in a sleeve bearing 2 and having vanes 4 and an encompassing ring 5. A face plate 6 on the drawing side of the pump and a face plate 7 on the cover side of the pump are provided. The manner in which such a pump functions is very well known, as is the construction depicted in FIG. 1, and therefore need not be described in detail except for purposes of comparison with the assembly to be described in connection with FIG. 2.

Thus, in FIG. 1, the drive shaft 1 has a peripheral groove 8 at its free end, at the cover side of the pump. Such groove 8 is within the axial recess 9 of face plate 7, and carries the retaining ring 10. The diameter of the retaining ring 10 is slightly larger than the diameter of the hub bore in the rotor 3 for the purpose of passing the drive shaft through the retaining ring. In this manner, the drive shaft is secured axially, providing the retaining ring 10 remains in the groove 8 and retains position against the margin of the bore in the rotor hub. Drive shaft 1 and rotor 3 are keyed by means of serrations in the usual manner, and the diameter of the retaining ring 10 is somewhat larger than the addendum circle of the serrations. It will be noted from construction of FIG. 1, that should the retaining ring jump out of groove 8, there is no longer any axial positioning of the drive shaft and it would fail within a short time.

Referring now to FIG. 2, wherein the same reference numerals are used for the same parts, it will be noted that the groove 8 for retaining ring 10 is at the end of the drive shaft 1 but is now confined within an annular recess 11, which is open faced at the cover side of the rotor hub. The diameter of recess 11 is essentially that of the outer diameter of the retaining ring 10, and it will be apparent that the retaining ring cannot expand radially in order to jump out of groove 8 since it is confined by the peripheral wall of recess 11.

For maintenance of a predetermined axial clearance between the end of drive shaft 1 and the face plate 7, the depth of recess 11 is equal to at least the thickness of retaining ring 10 in addition to such predetermined axial clearance as may be desired between the end of the drive shaft 1 and the face plate 7 which has the recess 9 into which the end of the drive shaft protrudes.

It will be clear that such recess 9 in FIG. 1 has no confining function insofar as ring 10 is concerned.

In connection with FIG. 2, since the diameter of the recess 9 in that construction is of smaller diameter than retaining ring 10 in the recess 11, it is thus fully and closely held in position by recess 11 and the face margin of recess 9 which also has a depth to provide predetermined axial clearance between the bottom and end of drive shaft 1.

It should also be noted that the retaining ring 10 may have any suitable radial clearance in recess 11 providing it fits closely enough therein so that the peripheral wall can prevent radial expansion under axial stress and dislodgment. Basically, the smaller the clearance between the retaining ring and the peripheral wall of recess 11 the more efficient will be the support of the ring to resist axial stress.

It will be recognized that the invention disclosed herein is useable in various other kinds of rotary pumps.

What is claimed is:
1. In a vane type pump having a drive shaft extending into the bore of a rotor having the drive shaft keyed in the rotor bore and being supported in a sleeve bearing at one side of said rotor and said pump having a face plate at the opposite side of said rotor adjacent the free end of said drive shaft;
the improvement comprising:
a groove (8) in said drive shaft and an annular open face recess (11) at an end of the bore of said rotor encompassing said groove;
a retaining ring (10) carried in said groove and confined radially within said recess against being dislodged from said groove to axially secure said drive shaft;
wherein the depth of said annular recess is at least equal to the thickness of said retaining ring in addition to a predetermined axial clearance between the drive shaft end and said face plate;
wherein said recess is open towards said face plate and said face plate has a recess (9) to accommodate said drive shaft end with said axial clearance; said latter recess having a diameter less than the diameter of said retaining ring so as to axially retain said retaining ring in said recess in said rotor.

* * * * *